July 22, 1941.　　A. L. KRONQUEST　　2,250,078
APPARATUS FOR REMOVING FLUX FROM SOLDER BONDED SIDE SEAMS
Filed June 22, 1938　　3 Sheets-Sheet 3

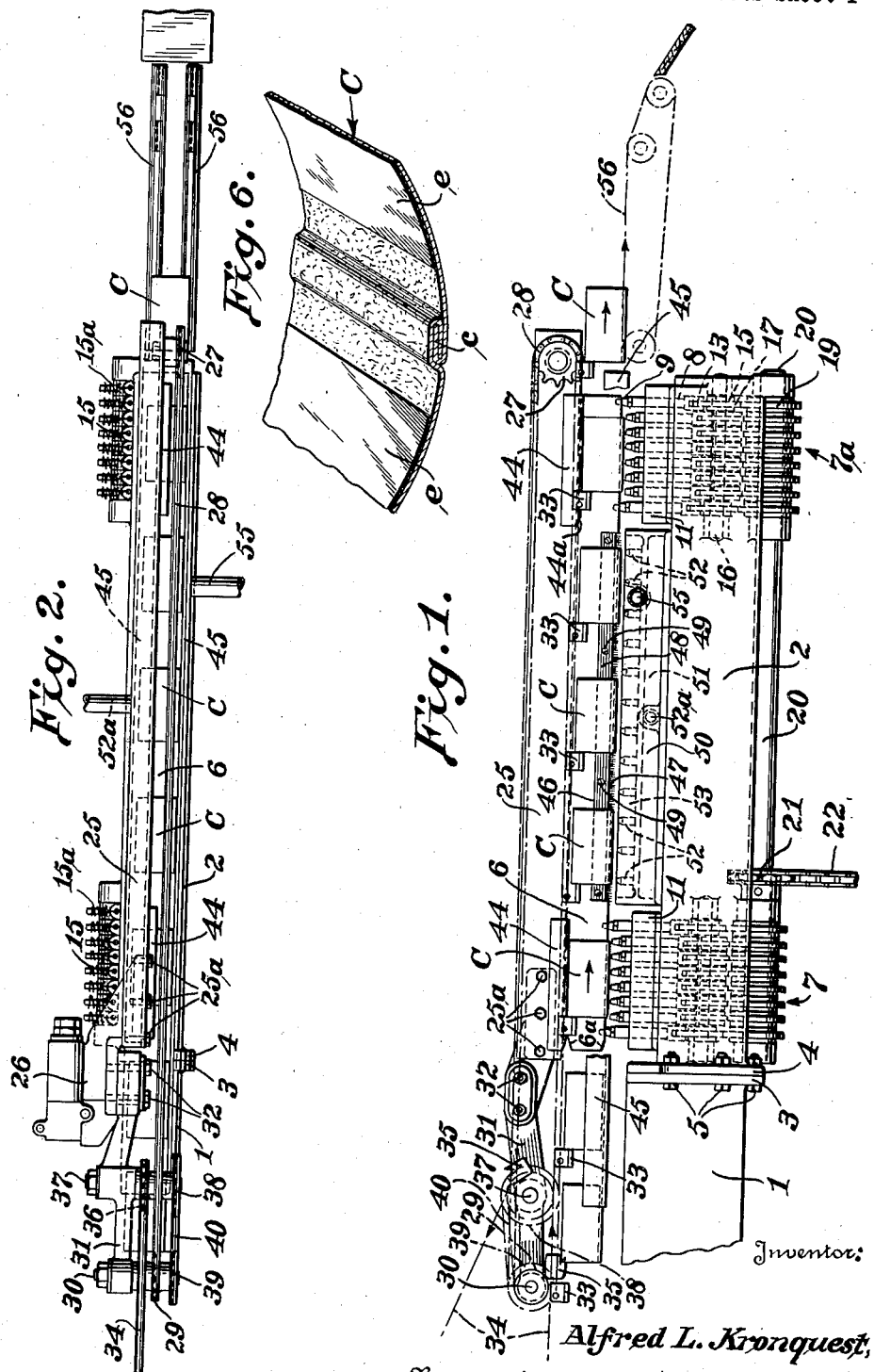

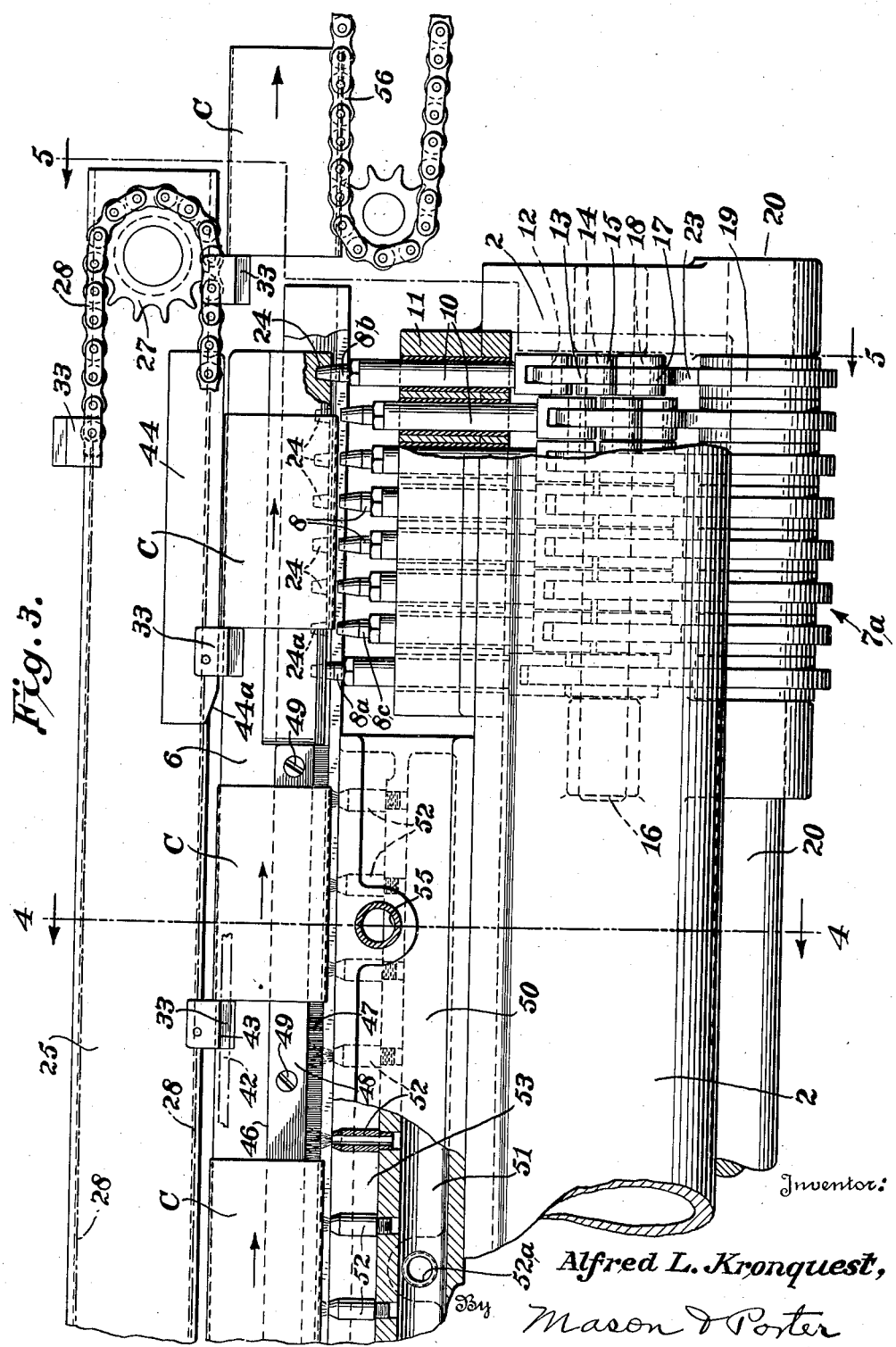

Inventor:
Alfred L. Kronquest,
By Mason & Porter
Attorneys.

Patented July 22, 1941

2,250,078

UNITED STATES PATENT OFFICE 2,250,078

APPARATUS FOR REMOVING FLUX FROM SOLDER BONDED SIDE SEAMS

Alfred L. Kronquest, Syracuse, N. Y., assignor to Continental Can Company, Inc., New York, N. Y., a corporation of New York Application June 22, 1938, Serial No. 215,243

4 Claims. (Cl. 15—88)

The invention relates to improvements in an apparatus for removing flux from the can body in the region of the solder bonded side seam. In order to properly solder bond the interengaged parts of a side seam it is essential to apply flux to the metal parts before the application of the solder. During the sweating in of the solder, some of the flux is forced from the side seam on to the metal parts in the region adjacent the side seam. This is objectionable, for several reasons, one of which is that it is unsightly and another that it interferes with the coating of the metal in the region of the side seam after solder bonding.

An object of the invention is to provide an apparatus for washing the metal parts in the region of the side seam so as to remove all traces of flux therefrom.

A further object of the invention is to provide an apparatus of the above type which is so disposed relative to the solder applying apparatus that the flux may be washed from the side seam immediately after the solder bond has been applied and set.

Other objects will in part be obvious and will in part be hereinafter more fully described.

In the drawings—

Figure 1 is a side view of an apparatus embodying the invention;

Fig. 2 is a plan view of the same;

Fig. 3 is an enlarged view partly in side elevation and partly in section showing the manner of supporting the horn over which the can bodies pass during the washing of the side seams and the means for the conveying of the can bodies along the horn. The means for applying water to the side seam and brushing the flux therefrom is also shown in this figure;

Fig. 6 is a view showing in section and in perspective a portion of the can body in the region of the side seam.

Figure 5:
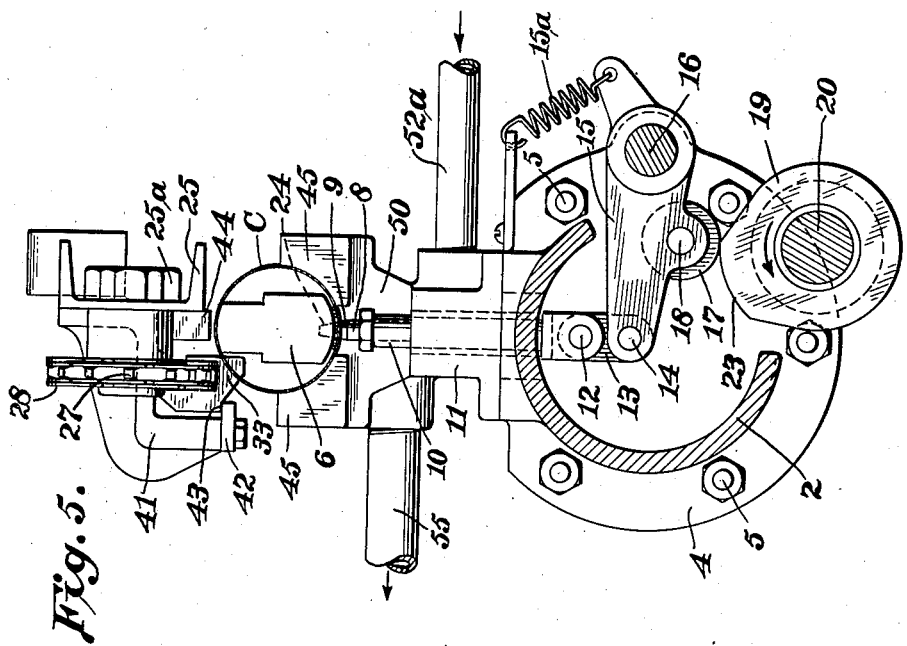
Fig. 5 is a sectional view on the line 5—5 of Fig. 3.

The apparatus embodying the improvements includes a horn over which the can bodies are fed from the soldering machine. A conveyor associated with the horn receives the can bodies from the feeding means of the soldering machine and conveys the can bodies in succession and in spaced relation on to the horn, thence along the horn and off from the other end thereof. The horn is supported by two groups of supporting pins. Each group contains a series of pins so that the entire group is of greater length than the can body. Each pin has its upper end tapered so so as to engage a socket in the horn over which the can bodies are fed. The pins are cam-actuated and moved out of engagement with the horn in succession and in timing with the travel of the cam body so that the horn is supported at both ends thereof by at least one of the pins of each group. The horn is cut away on its under side to form a recess which receives a brush which may be of any suitable character. Directly beneath the horn and the path of travel of the can bodies is a series of nozzles which are connected to a water supply so that water is forced continuously from the nozzles. As the can body passes over the nozzles, the outer surface of the metal parts in the region of the side seam will be thoroughly washed, and any flux adhering thereto will be washed therefrom. The can bodies are spaced so that the water jets will throw water into the brush between the passing can bodies, and thus the brush is supplied with water so that the inner surface of the metal parts in the region of the side seam will be washed and scrubbed as the can bodies pass along the horn.

Referring more in detail to the drawings, the washing apparatus is shown as an attachment to a can body maker which includes a soldering mechanism for applying solder to the outside of the side seam of the can body. The machine for making the can body and applying solder to the side seam is of the usual construction and has not been illustrated in the drawings.

Figure 4:
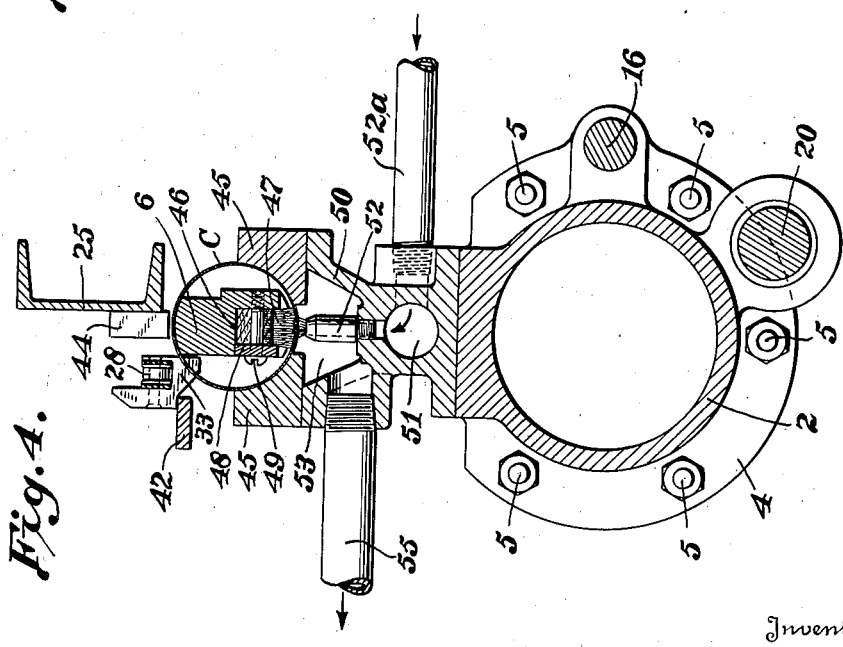
Fig. 4 is a sectional view on the line 4—4 of Fig. 3.

Extending from the frame of the soldering machine is a supporting arm 1 carrying a housing 2. The arm is provided with a flange 3 and the flanged end 4 of the housing 2 is secured to the flange 3 by suitable bolts 5, 5. This housing, as shown in Figure 4, is tubular in shape so as to provide a strong supporting arm which is relatively light.

Mounted directly above the housing 2 is a horn 6. This horn is supported by a group of rotary supporting cams 7 and fingers located adjacent the receiving end of the horn and a group of rotary supporting cams 7a and fingers located adjacent the delivery end of the horn. The fingers are generally designated 8 and they are arranged in groups of eight. The can bodies are indicated at C, and it is noted that the distance between the outermost fingers of each group is greater than the length of a can body. Each finger has a tapered portion 9 at the upper end thereof. Each finger is adjustably mounted in a sleeve 10 which is mounted for vertical movement in a supporting member 11 attached to the housing 2. The sleeves 10 project downwardly into the housing 2 and are pivotally connected at 12 to links 13. The links 13 are in turn pivotally connected at 14 to levers 15 mounted for free movement on a supporting shaft 16. A roller 17 is journaled at 18 in each lever 15 and bears on a suitably positioned and timed cam 19 fixed to a shaft 20. The shaft 20 carries a sprocket wheel 21 which is driven by a sprocket chain 22. The cam faces 23 of the cams are so disposed that the fingers are raised and lowered in such timing that a can body may pass by the group of fingers without contacting therewith. An anchored spring 15a engages each lever as shown in Figure 5, and constantly urges the roller 17 thereon toward the respective cam 19.

The horn 6 is provided with a series of recesses 24 which are spaced the same distance as the fingers and are tapered so that each thereof receives the tapered end 9 of a finger 8 when the particular finger is raised. As shown in Figure 3, the particular fingers designated 8a and 8b are raised so that the tapered ends thereof are in engagement with the recesses or sockets 24 in the horn 6. The intermediate fingers are retracted and the can body C is between the fingers 8a and 8b and moving in the direction of the arrow. Before the can body reaches the finger 8b it will be retracted, and the particular recess designated 24a will be uncovered so that the finger 8c can be raised into this recess. Thus it is that the horn is supported at its opposite ends on these groups of fingers, and the respective fingers of each group are so operated as to permit the can bodies to pass without contacting therewith. The fingers not only support the horn but they prevent it from endwise movement or lateral movement, as one or more of the fingers of each group are always in engagement with a recess or socket in the horn, thus holding the horn positioned until another finger of each group enters and supports the same.

Located above the horn 6 is a channel bar 25. This channel bar 25 is secured by bolts 25a to a bracket 26 which may be supported in any suitable way. This channel bar 25 supports a sprocket wheel 27 over which a conveyor chain 28 runs. This chain also runs over a sprocket wheel 29 carried by a shaft 30 journaled on a bracket 31 which is likewise bolted to the bracket 26 by suitable bolts 32. The conveyor chain 28 is provided with a series of dogs 33.

As noted above, the apparatus for washing the can bodies is attached to a soldering machine. The can bodies are conveyed through the soldering mechanism by a conveyor indicated diagrammatically at 34 (Fig. 1), and this conveyor is provided with dogs 35, each of which has a gripping jaw of the usual form for gripping and conveying the can body through the soldering mechanism. The conveyor 34 is in the form of a chain running over a sprocket wheel 36 (see Figs. 1 and 2). This sprocket wheel is mounted on a shaft 37 which also carries a sprocket wheel 38. Mounted on the shaft 30 is a sprocket wheel 39 which is smaller in diameter than the sprocket wheel 38. A chain 40 runs over these sprocket wheels 38 and 39 and will drive the sprocket wheel 39 at a slightly greater surface speed than the speed of the sprocket wheel 36. Therefore, the conveyor chain 28 will move slightly faster than the conveyor 34. As a result, a dog 33 will contact with each can body and strip it from the clamping jaw of the dog 35 by which it is being moved so that the previously effective dog 35 may pass around the sprocket wheel 36, as indicated in Figure 1 of the drawings.

The channel bar 25 is provided with brackets 41 which extend over the path of travel of the lower run of the conveyor chain 28. There are two of these brackets adjacent the ends of the channel bar, and at the lower ends of the brackets is a bar 42 disposed so that the dogs 33 are supported by this bar in their travel while moving the can bodies over the horn (see Figures 4 and 5). The dog as shown in Figure 5 is shaped so as to provide a flat shoulder 43 which rests on the bar 42 and slides along the same. The dog projects downwardly from the bar and contacts with the can body C at one side of the horn 6.

Also mounted on the channel bar 25 are abutment and guide plates 44. These abutment and guide plates are directly above the horn as shown in Figures 4 and 5. The purpose of these abutment and guide plates is to limit the upward movement of the horn, provided the fingers frictionally contact with the side walls of the recesses and tend to lift the horn. The horn normally is in the position shown in Figures 4 and 5, so that the can body passes freely along the horn without contact with these abutment plates. When the fingers are functioning in their proper manner, the horn is not raised into contact with the plate. The forward end of each plate is tapered as indicated at 44a, so that the can bodies as they move underneath the plates will not strike the ends thereof in case the horn should be raised. The horn 6 has the receiving end thereof tapered as indicated at 6a. This is to insure the passing of the can body on to the horn. Laterally spaced and suitably shaped longitudinal supporting members 45 are provided for supporting and guiding the can bodies after they leave the jaws of the gripping dogs 35 and as they are pushed along by the dogs 33 over the horn 6.

The horn is recessed as indicated at 46 in Figures 1 and 4 of the drawings. A brush 47, preferably of bristles, is placed in the recess and clamped therein by a clamping plate 48 which is pressed against the brush by suitable screws 49. This brush can be of the usual character and includes a shank portion in which the bristles are mounted so that the brush may be placed as a unit in the horn and removed therefrom for replacement when desired. This brush, as clearly shown in Figure 1, extends throughout a greater portion of the length of the horn and is so disposed in the horn that when the can bodies are moved along the horn they will pass over the brush and the brush will contact with the inside of the can body.

In Figure 6 of the drawings, a portion of the can body C is shown, in which the side edges of the body are interlocked by hooks to form a seam c. As shown in this figure, the blanks were coated with an enamel while the sheet was in the flat. The enamel coatings are indicated at e, e. The coating necessarily terminated short of the ends of the blank so as to leave the metal bare as indicated in Figure 6 of the drawings, where the metal is stippled. This side seam is at the lower side of the path of travel of the can body as it passes through the soldering mechanism, and a solder roll rotating in a bath applies solder to the side seam at the outside of the can body. The solder sweats into the side seam completely filling the side seam with solder. As is the usual practice, the metal parts which are to be solder bonded have flux applied thereto preferably while the sheet is in the flat. When the solder is sweated into the seam, the flux is sometimes forced ahead of the solder and from the side seam so that the surface of the metal parts, particularly on the inside of the can body, is likely to have flux adhering thereto. This adhering flux is objectionable, and the purpose of the present invention is to wash off the flux adhering to the metal in the region of the side seam. It is often desirable to completely cover the metal with a coating of lacquer or enamel, and one way of accomplishing this is to coat the can after the side seam is formed and solder bonded. The enamel or lacquer may be applied by spraying, or by flooding, or by forming a strip thereof in the region of the side seam. Unless the flux is removed from the surface of the metal it will interfere with the coating of the metal with the enamel or lacquer.

The brush alone is not sufficient to remove the lacquer. It is essential that water shall be applied to the brush so that the flux may be washed from the metal parts and removed from the can body by the brush. Mounted on the housing 2 between the supporting members 11 is a casing 50 formed with a chamber 51 and a series of nozzles 52 which project upwardly directly above the chamber 51 and are connected thereto. An inlet pipe 52a is provided for supplying the chamber 51 with water. The casing 50 is provided with a chamber 53 and the nozzles are located in this chamber. The supporting members 45 which support and guide the can bodies extend all the way to the rear of the horn and are attached to the casing 50. These guiding members together with the can body substantially close the upper side of this chamber 53. A drain pipe 55 is connected with the chamber 53. This drain pipe is of larger diameter than the inlet pipe 52a.

In the operation of the machine, the can bodies are fed in succession along the supports 45 and over the horn by the conveyor chain 28, and as they move along the horn, they pass over the brush 47. The water is flowing continuously from the nozzles 52 and will strike against the outer face of the can bodies and wash away any flux or impurities that may cling thereto. The water will also contact with the brush in the spaces intervening the passing can bodies so that the brush becomes filled with water and discharges the same on to the inner face of the can bodies in the region of the side seams. The brush contacting with the inner surfaces will also scrub the inner surfaces, and thus the side seams, both on the inside and the outside thereof. The washing water passes back into the chamber 53 and out through the drain pipe 55. When the can bodies move off from the end of the horn 6 they are delivered by the dogs 33 on to two conveyor chains 56, 56. These conveyor chains run over suitable sprocket wheels disposed so that the can bodies are delivered on to any suitable receiving means therefor.

It is obvious that many changes in the details of construction and the arrangement of the parts may be made without departing from the spirit of the invention as set forth in the appended claims.

Having thus described the invention, what I claim as new and desire to secure by Letters-Patent, is—

1. An apparatus for washing flux from the region of the side seam of a can body comprising longitudinally disposed supporting means for the can bodies, a conveyor for moving the can bodies continuously in spaced relation along the supporting means, a brush supported in position for contacting with the metal parts of the can body in the region of the inner face of the side seam, and means for projecting water against the outer face of the side seam and against the brush in the spaces intervening the passing can bodies.

2. An apparatus for washing flux from the region of the side seam of a can body comprising longitudinally disposed supporting means for the can bodies, a conveyor for moving the can bodies continuously in spaced relation along the supporting means, a brush supported in position for contacting with the metal parts of the can body in the region of the inner face of the side seam, means for projecting water against the outer face of the side seam and against the brush in the spaces intervening the passing can bodies, and means for receiving and carrying away the wash water.

3. An apparatus for washing flux from the region of the side seam of a can body comprising a horn over which the can bodies are moved, longitudinally disposed can body supporting means, a conveyor for moving the can bodies continuously in spaced relation along the supporting means and over the horn, a brush secured to the under side of the horn and disposed so as to contact with the metal parts of the can body in the region of the inner face of the side seam, and means disposed beneath the path of travel of the can body for projecting water against the outer face of the side seam and against the brush in the spaces intervening the passing can bodies.

4. An apparatus for washing flux from the region of the side seam of a can body comprising a horn over which the can bodies are moved, guides associated with the horn and engaging the outside of the lower portion of the traveling can bodies, a conveyor for moving the can bodies continuously in spaced relation along the supporting guides, said supporting guides being spaced so as to expose the can body in the region of the side seam, a casing supporting the supporting guides and forming a chamber beneath the can body extending longitudinally of the path of travel of the can body, a brush secured to the lower side of said horn and disposed so as to contact with the metal parts in the region of the inner face of the side seam, a series of nozzles projecting into said chamber for projecting water against the outer face of the side seam and against the brush in the spaces intervening the passing can bodies, means for supplying said nozzles with water, and means connected to said chamber for draining the wash water collecting therein.

ALFRED L. KRONQUEST.